United States Patent [19]

Walls-Muycelo

[11] 4,162,166

[45] Jul. 24, 1979

[54] POROUS, LIGHTWEIGHT, PARTICULATE AGGREGATES AND PROCESS OF MANUFACTURE

[76] Inventor: Jose Walls-Muycelo, Dakota 222-100, Mexico, Mexico, 18

[21] Appl. No.: 901,873

[22] Filed: May 1, 1978

Related U.S. Application Data

[63] Continuation of Ser. No. 718,276, Aug. 27, 1976, abandoned.

[30] Foreign Application Priority Data

Aug. 27, 1975 [MX] Mexico ............................ 160361

[51] Int. Cl.$^2$ .............................................. C04B 31/02
[52] U.S. Cl. ...................................... 106/40 R; 106/75
[58] Field of Search ............................... 106/40 R, 75

[56] References Cited

U.S. PATENT DOCUMENTS 3,990,901  11/1976  Engstrom et al. ..................... 106/75

*Primary Examiner*—James Poer
*Attorney, Agent, or Firm*—Sughrue, Rothwell, Mion, Zinn and Macpeak

[57] ABSTRACT

A porous lightweight particulate aggregate for use in concretes, mortars, building blocks and other building elements, comprises expanded and vitrified low alkalinity particles of a material composed of an alkali metal silicate having an $M_2O/SiO_2$ ratio of from about 1:2 to 1:4 wherein M is an alkali metal; silica in an amount of from about 0.1 to about 50% by weight of said alkali metal silicate; and an alkaline earth metal silicate in an amount of from 0.1 to 200% by weight of said alkali metal silicate, said particles having a density of not more than about 60 g/dm$^3$ and a compression strength of up to about 275 kg/cm$^2$ and having an expansion ratio of up to 15 times their original collapsed volume. Suitable fillers and additives may be added to said aggregate to provide specific and useful properties for a variety of uses thereof.

18 Claims, No Drawings

POROUS, LIGHTWEIGHT, PARTICULATE AGGREGATES AND PROCESS OF MANUFACTURE

This is a continuation of application Ser. No. 718,276, filed Aug. 27, 1976, now abandoned.

BACKGROUND OF THE INVENTION

This invention refers to highly porous, lightweight, particulate aggregates for use in concretes, mortars, building blocks and other building elements and, more particularly, it is related to aggregates having increased strength and reduced alkalinity and being highly compatible with binders, as well as to processes for the manufacture of said aggregates.

It is a well known fact that aggregates have been used for long in the building arts and that in accordance with the knowledge gained from the nature of said aggregates, it has been always known that for high compression strength, high temperature resistance and high adhesion of the concretes, the well recognized construction codes call for the use of only heavy and strong aggregates which are not lightweight in their nature. The use of lightweight porous aggregates has been generally restricted to elements that do not require a very high strength of the material, such as partitions, coverage slabs and the like, but are generally excluded from structural elements such as struts, girders, beams and the like, particularly in view of the fact that all the lightweight aggregates available in accordance with the prior art, were selected from low strength aggregates such as pumice, lava, slag, fired clay, shale or cinders from coal or coke, and the like. All these materials used for aggregates, as well as some other artificially prepared aggregates on the basis of expanded bentonites and expanded silicates, have left much to desire as to the strength of the material produced with the use thereof, in view of the fact that all such aggregates, in the first place, are available in very few particle sizes, and therefore do not lend themselves for a variety of uses, particularly in view of the fact that all the prior art aggregates are of a small particle size which required the provision of larger amounts of water whereby the strength of the binders was reduced and cracks were caused in the cured mass when dried. In the case of the prior art expanded silicate materials, these materials were highly brittle, whereby the particle size could not be increased and, on the other hand, showed a high alkalinity, which caused a chemical reaction with the common binders used and therefore, the material was furtherly degraded with the consequent loss of strength in the final product.

Therefore, in accordance with the prior art knowledge of different types of aggregates for use in concrete constuction, it was considered impossible to obtain mortars or concretes having a very high strength and a very low weight, because these two properties of the concretes and mortars were exclusive of each other, whereby if a high strength was required, then heavyweight aggregates had to be used in order to provide such a high strength, without any possibility of obtaining a lightweight material. On the other hand, when the weight of the material was the dominant characteristic, then the inclusion of lightweight aggregates of the above mentioned nature caused a considerable decrease in the strength of the material produced, whereby it was practically impossible to obtain a concrete or a mortar having both characteristics in conjunction.

Also in accordance with the prior art, certain lightweight building blocks have been obtained through the use of lightweight aggregates of a large particle size, joined together by means of a suitable binder, but in general terms these lightweight building blocks are merely used for coverage purposes and also as permanent falsework materials, and are excluded from use in structural elements such as columns, girders, beams, supporting walls and the like, in view of the fact that they are extremely brittle and also present a very low strength to compression and to flexure and shear stresses. In this type of lightweight building blocks, a problem always extant in accordance with the prior art is the fact that when expanded silicate material is used, this material presents a high alkalinity which reacts with the binders commonly used and decreases the strength of the binding action of such binder, whereby said blocks tend to easily crumble through pressing or abrasive action.

Therefore, for long it has been a need of the building arts to produce a lightweight aggregate which besides its lightweight would present a very high strength or compression and a very low alkalinity which may prevent side reactions with the binders used to produce building blocks therewith, in order to prevent crumbling thereof.

BRIEF SUMMARY OF THE INVENTION

Having in mind the defects of the prior art aggregates, it is an object of the present invention to provide a lightweight aggregate which at the same time may provide a very high strength to compression, flexure and shear stresses.

It is another object of the present invention to provide a lightweight aggregate based on an admixture of an alkali metal silicate and an alkaline earth metal silicate, which will show a very low density and yet a very high strength and also a very low alkalinity and therefore which will be highly compatible with all types of binders.

It is a further object of the instant invention to provide a lightweight aggregate of the above mentioned character, which despite its very high porosity, will not show brittleness characteristics.

A more specific object of the present invention is to provide a lightweight aggregate which will have a large particle size with a hollow center surrounded by a shell of highly porous material.

A still further object of the instant invention is to provide a method of preparing a lightweight aggregate of the above mentioned character, which method will be economic in its performance and yet highly efficient in providing a porous, strong, lightweight and large size particulate material.

A still further and more specific object of the instant invention is to provide a method for preparing a lightweight aggregate of the above mentioned character, which will provide for an expansion of the silicate materials with a ratio of up to 15 times the original collapsed volume, without thereby precluding its strength.

Other objects of the instant invention are to provide materials and elements obtained from these aggregates through binding thereof by suitable binders.

The foregoing objects and other ancillary thereto are preferably accomplished as follows: an aqueous dispersion of an alkali metal silicate, silica and an alkaline earth metal silicate is kneaded to form a slurry, the slurry is then reduced to particles having a size graded in accordance with the particle size desired for the finished aggregate, the temperature is then slowly raised to from about 110 to about 700° C. and then firing is commenced until a temperature of from about 700 to about 1500° C. is achieved and vitrification of the silicates is completed. When large size particles having a hollow center are desired, the mixture is provided, before heating, with a suitable amount of potassium nitrate which, on exploding when the heating is effected, provides the large central pore to produce a hollow particle structure. This hollow particle structure may also be produced when the heating is carried out at least in part in the presence of saturated steam in order to humidify and to therefore render the surfaces of the particles sufficiently plastic, with or without the existence of the potassium nitrate. Other suitable fillers or additives may be added to the aggregate to provide specific and useful properties for a variety of uses thereof.

The novel features that are considered characteristic of the instant invention are set forth with particularity in the appended claims. The invention itself, however, both as to its organization and its method of operation, together with additional objects and advantages thereof, will best be understood from the following description of specific embodiments thereof, which must be construed as illustrative but not limitative of the true scope and spirit of the invention.

DETAILED DESCRIPTION

The porous, lightweight, particulate aggregate in accordance with the present invention comprises graded size particles of a material composed of an alkali metal silicate preferably having an $M_2O/SiO_2$ ratio of from about 1:2 to about 1:4 with M being an alkali metal, preferably sodium; from 0.1 to 50% of the alkali metal silicate of silica ($SiO_2$); and from 0.1 to 200% of the alkali metal silicate of an alkaline earth metal silicate, preferably calcium silicate ($CaSiO_3$), said particles being expanded, highly porous particles of a density of not more than about 60 g/dm$^3$, having a compression strength of up to about 275 kg/cm$^2$, being resistant to temperatures of the order of about 1250° C. without any fusion or deformation and having an expansion ratio of up to 15 times their original collapsed volume and a considerable reduced alkalinity.

While applicant does not wish to be bound to any theoretical consideration, it is thought that the addition of silica to the alkali metal silicate considerably reduces the alkalinity of the resulting product, thus rendering the aggregate of the present invention highly useful for being applied, in conjunction with any commercial binder, to produce mortars, concretes or lightweight building blocks, without any unfavorable effect on said binder through alkaline side reactions as was the case with most of the prior art silicate type aggregates showing a relatively high alkalinity. The addition of suitable amounts of an alkaline earth metal silicate to the aggregate of the present invention, on the other hand, renders the thus obtained particles of the aggregate considerably harder and rigid and thus more resistant to compression stresses, without thereby precluding the expansion capacity of the particles to form a plurality of pores.

The aggregate of the present invention having the above described basic composition is composed of lightweight expanded particles of sizes that may be varied at will, of from about 1 micron to about 10 cm in their largest dimension, having a very large compression strength and yet a very low density and being also characterized by not being brittle and by showing a very low alkalinity, whereby its use may be broadened to fields of construction that were heretofore excluded for lightweight aggregates that were necessarily of a very low strength.

The particulate aggregate for the present invention preferably contains, in addition to the above described basic components, from 0.1 to 30% by weight of boric acid and the alkali metal tetraborate formed by the reaction of boric acid and the alkali metal oxide or added as such, to provide for an improved expansion coefficient and more particularly for a better vitrification of the particle upon heating thereof. Also, small amounts of metal carbides may be included through the addition of carbon to the reacting mass prior to carrying out the process that will be described in more detail hereinbelow, in order to provide a plurality of microcrystalline structures evenly distributed throughout the particle and furnishing very high strength properties thereto as well as increasing the melting point remarkably. The addition of carbon to the mass, in view of the burning thereof, will also provide a very large plurality of small pores evenly distributed throughout the structure of the particle. Finally, the particle may also contain from 0.1 to 30% by weight of the alkali metal silicate of an alkali metal oxide, preferably originating from the redox reaction of previously added alkali metal nitrate, and more particularly potassium oxide to increase hardness and the melting point of the aggregate.

Other suitable fillers or additives may be added to the aggregate of the present invention in order to provide other useful and specific properties that may render the same highly suitable for certain specific purposes. Illustrative of such fillers and additives are, inter alia, borax, diatomaceous earths, clays, expandable clays such as bentonite, kaolin, talc, residual limestones, asbestos, comminuted fiber glass, rockwool, ochre, volcanic ashes, garbage cinders, tripoli and the like.

The highly porous particle of the aggregate of the present invention may be composed of a very large plurality of small pores evenly distributed throughout the mass of the material or it may have a relatively large central pore surrounded by a shell of the highly porous material, depending on the type of treatment used for preparing the aggregate. Both structures, however, are equally resistant to compression and high temperatures and both provide an absorbent outer surface which renders the performance of binders highly efficient, inasmuch as any binder added will be absorbed into the pores and on curing will provide a structure having a very high adhesion which will prevent any tendency to crumbling of the material.

The aggregate of the present invention may be prepared by the process which includes the steps of:

(a) dissolving the alkali metal silicate in an amount of water sufficient to form a solution containing from about 35% to about 50% of total solids, and adding an amount of from 0.1 to 50% by weight of the alkali metal silicate of finely divided silica and an amount of from 0.1 to 200% by weight of the alkali metal silicate of a finely divided alkaline earth metal silicate, with a vigorous kneading action after each addition until a homogeneous slurry is obtained;

(b) reducing the thus obtained slurry to particles of a preselected size depending on the desired size of the finished aggregate;

(c) heating the thus obtained particles to a temperature of from about 110° C. to about 700° C. for a period of time from about 0.1 seconds to about 5 minutes in order to produce the necessary expansion of the particles through the blowing action of the water vapor released, with the formation of a large plurality of pores within each particle;

(d) firing the expanded and relatively dried particles to a temperature of from about 700° to about 1500° C. for a period of time of from about 5 seconds to about 1 minute to complete the expansion of the material and produce vitrification thereof; and (e) slowly cooling said fully expanded and vitrified particles to room temperature whereby a particulate lightweight highly porous aggregate material is obtained.

The properties of the aggregate obtained by means of the above described process may be modified by the addition, to the starting slurry, of certain other additives that produce additional and improved properties to said finished aggregate.

In accordance with certain preferred embodiments of the process of the present invention, boric acid may be kneaded into the slurry formed in (a) above, in an amount of from about 0.1 to about 30% by weight of the alkali metal silicate which boric acid, on partially reacting with the alkali metal oxide moiety of the silicate material, produces alkali metal tetraborate and on being heated produces metaboric acid and water vapor, thus forming a silicate-tetraborate glass which aids to obtain a highly resistant vitrification of the material and provides for a further expansion thereof during the vitrification operation described in (d) above.

Another preferred embodiment of the invention comprises the addition, to the kneaded slurry obtained from (a) above, either with the previous addition of the boric acid or without such addition, of an amount of from about 0.1 to about 400% by weight of the alkali metal silicate of finely divided carbon, to provide for an increased thermal expansion and vitrification, as well as for an increase in the melting point of the aggregate. The addition of carbon to the slurry prior to heating, produces the formation of small amounts of metal carbides on reacting with the impurifying metals of the silica and silicates of the mixture when the latter is being fired to high temperatures, thus producing a plurality of microcrystalline structures that considerably increase the hardness of the aggregate and improve the melting point thereof. Also, the addition of carbon aids to the obtention of an extremely lightweight structure, in view of its natural porosity and its homogeneous distribution throughout the mixture. The addition of carbon also produces the segregation of hollow and solid volumes throughout the mass, in view of the release of carbon dioxide that does not diffuse as quickly as other lighter gases, therefore improving the insoluble characteristics of the particles. It also aids in the expansion of the material through the release of carbon monoxide which forms very small pores when the material is being fired in step (d) above.

A structure of the aggregate particles that has been found highly useful for certain applications, such as for the manufacture of the so called "mineral foam building blocks", is one in which each particle of the aggregate is formed as a centrally hollow sphere-like particle having a very hard shell of highly porous silicate material on the surface of the sphere-like particle and a very large central spheroidal pore surrounded by said material.

The above described hollow particles may be obtained in accordance with the process of the present invention, by the further addition, to the slurry obtained in accordance with any one of the above described embodiments, of a blowing agent which is sufficiently volatile to produce a violent explosion on heating thereof during the heat expansion step (c) described above.

While any kind of known sulfur type blowing agent as well as any highly volatile solid finely divided organic material such as wheat flour, cornstarch, wood powder, wood pulp, cork, sawdust and the like may be conveniently used to produce the large central pore in the hollow particles, a highly preferred embodiment of the present invention comprises adding an amount of from about 0.1 to about 30% by weight of the alkali metal silicate of the potassium nitrate which in the presence of a reducing environment, violently releases nitrogen which forms the central pore, and at the same time forms potassium oxide which increases the hardness and the melting point of the finished aggregate.

The above mentioned hollow structure of the particles of the aggregate of this embodiment of the present invention may also be obtained, with or without the addition of a blowing agent having explosive characteristics, by a mere slight modification of the expansion step described in (c) above. For this purpose, the heating operation is carried out in two stages, namely, by firstly heating the particles to a temperature of from about 110° to about 300° C. in a moist environment such as a stream of saturated steam in close contact with the particles, in order to reincorporate water molecules to the surfaces thereof, whereby said surfaces will remain sufficiently plastic to permit the particles to be inflated in a globe-like fashion during the heat expansion step, and then continuing the heating operation under dry conditions until a temperature of from about 300° to about 700° C. is reached as before.

The graining of the slurry formed by kneading together the ingredients described above, may be achieved by any known means. It is preferred in accordance with the present invention, however, to carry out such operation, when the slurry has a liquid consistency, by spraying the fluid through a suitable nozzle into a heated environment to thereby produce pre-dried particles. When the slurry has a thick paste-like consistency, then the preferred method is to entrain the slurry in a fast moving gas or vapor stream and ejecting the same through a suitable nozzle. Finally, when the slurry has been permitted to dry and form a solid, then the method includes the use of a grinder for solids, which permits the obtention of particles of any desired size.

The present invention will be more fully understood by having reference to the following illustrative and non limitative examples.

EXAMPLE 1

A kneader was charged with 10 kg of an aqueous sodium silicate syrup containing 5 kg of sodium silicate of the formula $Na_2O.2SiO_2$ and 2 kg of finely divided silica ($SiO_2$) were thoroughly incorporated to said syrup, followed by 10 kg of calcium silicate ($CaSiO_3$). The kneader was operated for about 2 minutes until a thick paste of silicate material was obtained. The paste was permitted to dry at a temperature of 90° C. and was divided into coarse particles by means of a slow rotatory hammermill, whereby pre-dried particles of silicate material were produced. The particles were heated by a stream of air until a temperature of 650° C. was obtained and the temperature was maintained for a period of about 10 seconds more, whereby particles expanded about 10 times its original volume and containing a large plurality of evenly distributed pores were obtained. The expanded particles were fired to rapidly achieve a temperature of 1250° C. (about 1 minute) and the vitreous highly expanded particles (13 times their original volume) were slowly permitted to cool down to room temperature. The coarse particulate aggregate thus obtained was formed of porous particles of about 3 cm and showed a density of about 250 g/dm$^3$ and a compression strength of about 210 kg/cm$^2$ and did not melt nor deform at temperatures below about 1200° C.

EXAMPLE 2

A kneader was charged with 10 kg. of a 35% sodium silicate aqueous syrup of the formula $Na_2O.2.8SiO_2$. Then 1 kg. of finely divided silica, 5 kg. of calcium silicate and 1 kg of boric acid were successively kneaded into the syrup to thereby form a liquid slurry of the silicate material. The slurry was spray dried into an atmosphere of air maintained at a temperature of about 500° C., whereby small expanded particles of about 1 mm were obtained. The particles were then fired at a temperature of 1500° C. for a few seconds to produce a virtually instantaneous vitrification thereof, and were then permitted to cool to room temperature. The fine particulate aggregate thus obtained had a density of about 60 g/dm$^3$ and a compression strength of about 272 kg/cm$^2$ and did not melt nor deform at temperatures below about 1250° C.

EXAMPLE 3

A mixture of 10 kg of sodium silicate ($Na_2O.3SiO_2$) syrup at a 40% concentration, 2 kg of finely divided silica, 8 kg of finely divided calcium silicate, 0.5 kg of boric acid and 10 kg of finely divided coke was subjected to the process described in Example 1.

A coarse aggregate showing a density of about 50 g/dm$^3$ and a compression strength of about 220 kg/cm$^2$ was produced, and the aggregate did not melt nor deform at temperatures below about 1250° C.

EXAMPLE 4

The addition of 1.0 kg of potassium nitrate to the mixture of Example 3 and following the process of Example 2 produced an aggregate composed of relatively fine (3 mm), hollow particles showing a large hollow interior surrounded by a shell of highly porous silicate material. The density was about 40 g/dm$^3$ and the compression strength was about 250 kg/cm$^2$ and the aggregate did not melt or deform at temperatures below about 1200° C.

EXAMPLE 5

The starting mixture used in Example 1 was kneaded and divided into particles and was then subjected to a first slow heating step in the presence of saturated steam until a temperature of about 300° C. was reached. Thereafter the process described in Example 1 was followed by first completing the heating step under dry heat to a temperature of about 700° C. and firing until a temperature of about 1500° C. was reached. The aggregate was comprised of very large particles (about 5 cm) having a hollow center surrounded by a shell of highly porous silicate material, which showed a density of about 35 g/dm$^3$ and a compression strength of about 195 kg/cm$^2$. The coarse aggregate did not melt or deform below about 1200° C.

It can thus be seen that a novel lightweight aggregate has been obtained, which may be applied to a vast variety of uses in view of its very low density as compared with solid heavy aggregates of a conventional nature, without appreciable differences in the compression strength and temperature resistance thereof. Therefore, the aggregates of the present invention can be used as lightweight aggregates for concretes and mortars based on Portland cement, lime and gypsum for use in the manufacture of various products useful in the building arts, also in view of the fact that a broad range of particle sizes can be obtained (from about 0.001 cm to about 10 cm) and because the particles of the aggregate of the present invention have a very large number of pores that permit a very solid anchorage of the binders without the need of using large amounts of water as was the case of the prior art products, and also because the significantly reduced alkalinity of the aggregate particles prevents undesired side reactions with the binders that tend to produce weak spots and cracks in the finished and cured material, particularly when the ambient temperature varies.

Another advantage of the aggregates of the present invention is that, being of a vitreous and completely insoluble character, they permit the use of steam to cure the concretes and mortars without any deletereous effect on said aggregate as was the case with the prior art aggregates, particularly the lightweight prior art aggregates.

As the strength of the aggregates of the present invention is of a similar order of magnitude as prior art solid aggregates (from about 200 to 250 kg/cm$^2$), this enables for the first time the use of lightweight aggregates for structural concretes, therefore permitting the obtention of Portland cement concretes of a density as low as about 250 g/dm$^3$ without materially affecting the strength thereof. This characteristic, of course, opens an entirely new field to lightweight aggregate materials, and such aggregates may be also used in concretes for prestressed members and prefabricated members for low cost housing.

As the aggregates of the present invention have a highly porous structure, they permit the obtention of concretes and mortars of very efficient acoustic properties for use as partitions, ceilings and the like and the building blocks obtained with these aggregates are admirably suitable for very low cost lightweight acoustic and thermally insulating partitions, supporting walls, slab and girder closures, and the like.

Different types of building and ornamental elements can also be obtained by molding mixtures of the above described aggregates and suitable binders such as fast curing silica solutions, resins, organic gums, rubber-type adhesives and the like, and then curing the binders.

The aggregates of the present invention can also be used for spray coating of building elements for thermal and acoustic insulation purposes, as well as low cost lightweight fillers for plastics and the like.

Although certain specific embodiments of the present invention have been shown and described, it is to be understood that many modifications thereof are possible. The invention, therefore, is not to be restricted except insofar as is necessitated by the prior art and by the spirit of the appended claims.

I claim:

1. A porous lightweight particulate aggregate comprising expanded and vitrified low alkalinity particles having a density of not more than about 60 g/dm$^3$, a compression strength of from about 195 to about 275 Kg/cm$^2$, a temperature resistance without undue fusion or deformation up to about 1250° C. and an expansion ratio of up to about 15 times the original volume of said particles, said expanded and vitrified low alkalinity particles having been obtained by heating and firing dried particles of the composition comprising an alkali metal silicate having an M$_2$O/SiO$_2$ ratio of from about 1:2 to about 1:4 wherein M is an alkali metal, from about 0.1 to about 50% by weight of said alkali metal silicate of silica, from about 0.1 to about 200% by weight of said alkali metal silicate of an alkaline earth metal silicate, and from about 0.1 to about 30% by weight of said alkali metal silicate of boric acid which upon firing produces a silicate-tetraborate glass.

2. The aggregate according to claim 1 wherein said alkali metal is sodium and said alkaline earth metal is calcium.

3. The aggregate according to claim 2 wherein said composition further comprises one or more additives selected from the group consisting of carbon, metal carbides and potassium oxide.

4. The aggregate according to claim 1 wherein said expanded and vitrified low alkalinity particles contain a large plurality of small pores evenly distributed throughout the body thereof.

5. The aggregate according to claim 1 wherein said expanded and vitrified low alkalinity particles are globe-like particles having a relatively large pore in the center thereof surrounded by a shell of material containing a large plurality of small pores evenly distributed throughout said shell.

6. A process for the manufacture of a porous lightweight particulate aggregate comprising expanded and vitrified low alkalinity particles having a density of not more than about 60 g/dm$^3$, a compression strength of from about 195 to about 275 Kg/cm$^2$, a temperature resistance without undue fusion or deformation up to about 1250° C. and an expansion ratio of up to about 15 times the original volume of said particles, comprising:
    (a) dissolving an alkali metal silicate in water to form a solution of from about 35% to about 50% by weight of total solids, and kneading into said solution from about 0.1 to about 50% by weight of the alkali metal silicate of finely divided silica, from about 0.1 to about 200% by weight of the alkali metal silicate of a finely divided alkaline earth metal silicate and from about 0.1 to about 30% by weight of said alkali metal silicate of boric acid which upon firing produces a silicate-tetraborate glass, in order to obtain a homogeneous slurry;
    (b) partially drying the thus obtained slurry to produce a paste-like or solid mixture;
    (c) reducing said mixture to particles of a preselected size depending on the desired size of the finished aggregate;
    (d) heating said particles to a temperature of from about 100° C. to about 700° C. for a period of time of from about 0.1 second to about 5 minutes to remove the remaining water and expand the particles with the formation of a large plurality of pores therein;
    (e) firing said expanded particles at a temperature of from about 700° C. to about 1500° C. for a period of time of from about 5 seconds to about 1 minute to complete the expansion of the particles and produce vitrification thereof; and
    (f) slowly cooling said expanded and vitrified particles to room temperature.

7. The process according to claim 6 wherein from about 0.1 to about 400% by weight of carbon, based on the weight of said alkali metal silicate, is added to said slurry.

8. The process according to claim 7 wherein a blowing agent in an amount of from about 0.1 to about 30% by weight of said alkali metal silicate is added, whereby hollow particles having a large central pore surrounded by a hard porous shell are obtained.

9. The process according to claim 8 wherein said blowing agent is an organic blowing agent.

10. The process according to claim 9 wherein said organic blowing agent comprises wheat flour.

11. The process according to claim 8 wherein said blowing agent is potassium nitrate.

12. The process according to claim 6 wherein the heating of said particles is effected in a first stage under moist environmental conditions in which the temperature is raised from about 110° to about 300° C. and a second stage under dry conditions until a temperature of from about 300° to about 700° C. is reached, whereby a hollow particle having a relatively large central pore surrounded by a hard porous shell is obtained.

13. The process according to claim 12 wherein the moist environmental conditions are produced by contacting the particles with saturated steam.

14. The aggregate according to claim 3, wherein said carbon is present in an amount of from about 0.1 to about 400% by weight of said alkali metal silicate of finely divided carbon.

15. The aggregate according to claim 1 wherein said composition further comprises a blowing agent selected from the group consisting of a sulfur type blowing agent, an organic volatile solid finely divided blowing agent, or potassium nitrate.

16. The aggregate according to claim 1, wherein said composition to be heated and fired further comprises about 0.1 to about 30% by weight of said alkali metal silicate of potassium nitrate as a blowing agent.

17. The aggregate according to claim 1, wherein said composition consists essentially of said alkali metal silicate, said silica, said alkaline earth metal silicate and said boric acid.

18. The process according to claim 6, wherein said slurry consists essentially of said water, said alkali metal silicate, said silica, said alkaline earth metal silicate and said boric acid.

* * * * *